Nov. 6, 1928.  
G. THILO  
1,690,881  
CIRCUIT FOR AMPLIFYING DIRECT OR ALTERNATING CURRENTS BY VACUUM TUBES  
Filed Dec. 24, 1924
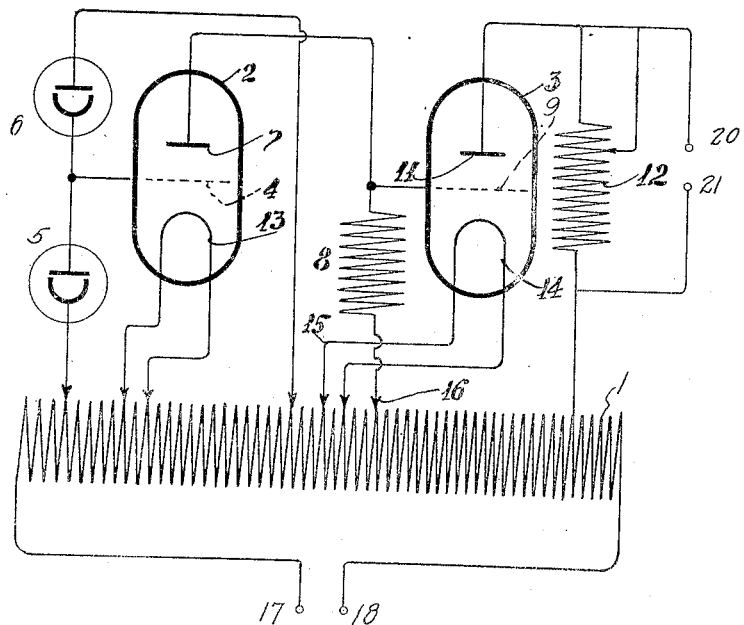
INVENTOR  
Gunther Thilo  
BY  
Van Deventer & Nickel  
ATTORNEYS Patented Nov. 6, 1928.

1,690,881

UNITED STATES PATENT OFFICE.

GÜNTHER THILO, OF FRIEDENAU, NEAR BERLIN, GERMANY, ASSIGNOR TO RADIO PATENTS CORPORATION, OF NEW YORK, N. Y., A CORPORATION OF NEW YORK.

CIRCUIT FOR AMPLIFYING DIRECT OR ALTERNATING CURRENTS BY VACUUM TUBES.

Application filed December 24, 1924, Serial No. 757,885, and in Germany January 5, 1923.

This invention relates to a method of amplifying direct and alternating currents by means of discharge tubes. According to the invention both the anode voltage and the grid voltage are derived from the same potentiometer by a particular connection. The advantage of being able to suitably and easily adjust to various voltages is thus obtained. Furthermore, this connection can be used for the amplification of either direct or of alternating current. If one applies the taps for the different voltages so that the grid voltage resulting from the anode current is partly or wholly compensated, the condenser used in the grid circuit can be omitted even with alternating current.

The invention will be hereinafter fully explained with reference to the drawing which shows one form of construction by way of example.

From the potentiometer 1, the ends of which are connected to a source of voltage of sufficient potential difference, leads 17 and 18, the anode- and grid-voltages of the two tubes 2 and 3 are variably appropriated.

Connected to grid 4 of tube 2 are two resistances, 5 and 6, (light sensitive cells), disposed in divided potential fashion, whose terminals connect with the potentiometer 1.

Owing to the drop of voltage in the potentiometer 1 voltages of different potential are supplied to the cells 5 and 6, these voltages being equal if the ratio of resistance of the two tubes is equal to unity. Assume that on the grid 4 of tube 2 the preliminary voltage is equal to 0. Upon exposure to light of one of the cells or upon unequal exposure to light of both cells the resistance of the same alters so that the one or the other of the potentials laid on the same predominates and produces a corresponding preliminary voltage on the grid 4.

The use of two light cells, one of which is to receive more illumination, enables the resistance and therefore the voltage on the grid 4 to vary according to the light signals. Moreover, slight room illumination would leave the system unaffected, as the cells are balanced. These two cells are connected so that by unbalancing the two, due to extra illumination on one, a grid 4 is effected as desired.

Likewise anode 7 of tube 2 is connected via a resistance 8 to the potentiometer. Grid 9 of the second tube 3 is branched from resistance 8 and anode 11 of tube 3 connects to potentiometer 1 via adjustable resistance 12. The circuit of anode 11 is connected to output terminals 20 and 21 which may serve as the input or still another amplifying tube, or be connected direct to the device requiring the amplified current. Filaments 13, 14 are also adjustably attached to potentiometer 1. The voltage of the system applied to the filaments can likewise be taken from the potentiometer. The entire plan corresponds to that used in cascade amplification. The connection point 15 of filament 14 of tube 3 is so located that the grid voltage, arising through the anode circuit of resistance 8, is partly or wholly compensated by the voltage drop between lead 15, and contact point 16 of resistance 8.

If for instance it is desired to have a current equal to $(1^a)$ flow through resistance 8 towards the tube 2 and if 8 has the resistance (R), contact 16 needs to be shifted on the potentiometer only so much that the voltage-difference $15-\text{contact } 16 \text{ is} = 1_a R$. 16 may evidently remain in its position and 15 may be shifted until the desired effect has been produced. In this manner it is possible to omit the condenser and the high ohmic leaking resistance which are otherwise required in the leading in wire of the grid 9. This leaking resistance had served, as generally known, only to protect the grid against the high positive anode voltage of the preceding tube as well as to prevent the flowing away of the grid potential. The high resistance regulated then the slow flowing off of the grid potential so that on the grid the desired remainder was left. These means are no longer required according to the invention as the desired and necessary negative preliminary voltage on the grid can be very accurately adjusted by adjusting the potentiometer handles. In a similar manner a compensating of the continuous current grid voltage is effected also for tube 2 as can be clearly seen from the drawing.

Having described my invention, what I believe to be new and desire to secure and protect by Letters Patent of the United States is:—

1. A circuit for amplifying electric current, comprising a potentiometer having its terminals connected to the opposite leads of a supply circuit, vacuum tubes, each having an anode, a cathode, and a grid, the anode of one tube being united to the grid of another of said tubes, and connections between the tubes and the potentiometer at such points that the voltage on said last-named grid due to anode current is compensated.

2. A system of electrical current amplification comprising a plurality of thermionic devices, each having a plate, a grid, and a filament, a potentiometer, connections therefrom to said grids, variable resistors in circuit with said connections, and a compensating resistance in circuit with one of said grids, one of said devices having a connection between its anode and the grid of another of said devices, and said devices being resistance-coupled one to another.

3. A system of electrical current amplification comprising a plurality of thermionic devices, each having a plate, a grid, and a filament, a potentiometer, connections therefrom to said grids, variable resistances in circuit with such connections, a compensating resistor in circuit with one of said grids, a coupling resistor between said devices, and connections from said potentiometer to said filaments at such points that the voltage of the associated grid is compensated for the voltage drop in the coupling resistor.

4. A plurality of electron tubes connected in cascade, control elements, anodes, and heated cathodes in said tubes, a potentiometer, connections between anode and control elements of consecutive tubes, connections from said tubes to the potentiometer providing suitable operating potential to the anodes and control elements, partly by virtue of the cathode heating current being drawn from said potentiometer.

5. A circuit for amplifying electric current, comprising a potentiometer, electron tubes in cascade, each having anode, cathode, and control elements, and connections to permit said elements to be supplied with suitable power and potential from said potentiometer.

6. In an amplification system a multiplicity of electron tubes each including grid, filament and plate electrodes, said tubes being coupled in cascade, a potentiometer arranged to be supplied with energy from a power source and connections between different points on said potentiometer with said electrodes for supplying power and potential to said electrodes from different points along said potentiometer whereby the plate circuit of one tube may be coupled in cascade with the grid circuit of a succeeding tube without impairing the operation of said circuits.

7. In an amplification system a plurality of electron tubes each having grid, filament and plate electrodes, a potentiometer arranged to be excited from a power source, taps on said potentiometer connected to said electrodes, means coupling the output circuit of one tube with the input circuit of a succeeding tube, means for compensating for the negative voltage drop in said coupling means, means comprising a tap on said potentiometer for picking off a positive potential for the plate electrode of one of said tubes with respect to the filament potential of the second tube in cascade, whereby said tubes operate to increase the amplitude of current supplied to the first of said tubes in cascade.

8. In an amplification system a plurality of electron tubes each having grid, filament and plate electrodes with the output circuit of one electron tube conductively connected with the input circuit of the succeeding electron tube for coupling said tubes in cascade, a resistance common to said input and output circuits, a potentiometer arranged to be supplied with excitation current and having taps connected with the electrodes of said electron tubes in such relation as to supply proper operating potention to the plate of one electron tube and to the grid of the succeeding electron tube through said common resistance.

Signed at Berlin, Germany, this 29th day of November, A. D. 1924.

GÜNTHER THILO.